United States Patent [19]

Brückner

[11] Patent Number: 5,445,392
[45] Date of Patent: Aug. 29, 1995

[54] APPARATUS FOR SEALING A CLEARANCE

[75] Inventor: Gerhard Brückner, München, Germany

[73] Assignee: MTU Motoren- Und Turbinen-Union Muenchen GmbH, Munich, Germany

[21] Appl. No.: 980,193

[22] Filed: Nov. 23, 1992

[30] Foreign Application Priority Data

Nov. 26, 1991 [DE] Germany .................. 41 38 784.8

[51] Int. Cl.⁶ .................................................. F16J 15/16
[52] U.S. Cl. ........................................ 277/27; 277/71;
277/138; 277/174; 277/177
[58] Field of Search ............... 277/27, 71, 138, 139,
277/173, 174, 177; 239/265.19, 265.35

[56] References Cited

U.S. PATENT DOCUMENTS

| | | | |
|---|---|---|---|
| 3,815,926 | 6/1974 | Vore | 277/34 |
| 3,869,133 | 3/1975 | Pesendorfer | 277/27 |
| 3,926,444 | 12/1975 | Gripe et al. | 277/177 |
| 4,098,076 | 7/1978 | Young et al. | 239/265.19 X |
| 4,519,543 | 5/1985 | Szuminski et al. | 239/265.19 |
| 4,592,508 | 6/1986 | Thornock | 239/265.19 |
| 4,702,671 | 10/1987 | Brinkman et al. | 277/174 X |
| 4,944,215 | 7/1990 | Nimmo et al. | 277/177 X |
| 4,979,756 | 12/1990 | Krambrock et al. | 277/177 X |
| 5,016,818 | 5/1991 | Nash et al. | 239/265.19 X |
| 5,288,020 | 2/1994 | Pirker | 277/27 X |

FOREIGN PATENT DOCUMENTS

| | | |
|---|---|---|
| 0125896 | 11/1984 | European Pat. Off. . |
| 0367317 | 5/1990 | European Pat. Off. . |
| 1090751 | 10/1960 | Germany . |
| 1200083 | 9/1965 | Germany . |
| 2753336 | 5/1979 | Germany . |
| 3737344 | 5/1988 | Germany . |
| 4123303 | 1/1993 | Germany . |
| 1537595 | 1/1979 | United Kingdom . |
| 2078306 | 1/1982 | United Kingdom . |
| 2091356 | 7/1982 | United Kingdom . |

Primary Examiner—William A. Cuchlinski, Jr.
Assistant Examiner—John L. Beres
Attorney, Agent, or Firm—Evenson, McKeown, Edwards & Lenahan

[57] ABSTRACT

This invention relates to apparatus for sealing a clearance between two components in relative movement one with respect to the other. A sealing strip between the two components is arranged in a direction transverse to the direction of movement to bear against a sealing face of the first component to seal the clearance. The sealing strip is allowed to float in a groove in the second component on a fluid flowing all around between the groove and sealing strip. This invention finds preferred use on rectangular-section exhaust gas nozzles of turbojet engines, where the components represent the lateral wall or nozzle flaps and the fluid is air tapped at the compressor, which simultaneously serves to cool the nozzle flaps and the sealing strip. The contact pressure of the sealing strip against the sealing face can therefore be made a function of engine load.

20 Claims, 3 Drawing Sheets

APPARATUS FOR SEALING A CLEARANCE

BACKGROUND AND SUMMARY OF THE INVENTION

This invention relates to apparatus for sealing a clearance between two components in relative movement with respect to one another, where a sealing strip is arranged between the two components in a direction transverse to the direction of movement to bear against a sealing face of the first component to seal the clearance. Apparatus of this general description has been disclosed in British Patent Document GB 2 078 306.

Reliable sealing of hot gas and/or pressure energized clearances formed between adjacent components poses substantial problems especially when the components are moving relative to one another, as is the case with exhaust gas nozzles of turbojet engines or rocket propulsion systems. Thus, plane nozzle walls and flaps as they are used on variable 2D nozzles are exposed to differential, thermally induced expansions resulting from the jet of hot exhaust gas. This problem has been tackled in the above-noted GB 2 078 306 A, where a cylindrical seal is arranged in the clearance between two surfaces facing one another at an angle. For this purpose, the seal is retained on the face of a first surface and urged under the action of a leaf spring against the second surface for sealing effect. At the elevated temperatures prevailing in the exhaust gas stream of exhaust nozzles, springs prove to be insufficiently reliable. Another consideration is that it is impossible to flexibly adapt the spring to varying operating conditions, since on account of the spring characteristic, a defined contact pressure can be set at a single operating point only.

In a broad aspect of the present invention, apparatus of the above generic description is provided to operate reliably and with little wear also under pressure and at elevated temperatures, with operationally caused component movements being duly considered.

It is a particular object of the present invention to provide an arrangement where the sealing strip is allowed to float in a groove in the second component on a fluid flowing all around between the groove and the sealing strip and is urged by the fluid against the first component, where the fluid is channeled into the groove through feed ducts in the second component, and where the operating pressure of the fluid exceeds the ambient pressure surrounding the components.

The means of the present invention advantageously provides a reliably operating seal to protect against the ingress especially of pressurized hot gas. The fluid used to position the seal simultaneously provides the necessary contact pressure of the sealing strip against the first component and protects the sealing strip from direct exposure to hot gas. No-contact positioning of the sealing element within the groove of the second component ensures low-wear and, hence, trouble-free operation of the sealing means. The sealing action of the fluid stream permits the contact pressure of the sealing element against the first component to be reduced. This in turn reduces the actuating forces required for displacing the components relative to one another, as perhaps in nozzle actuation.

Controlling the volume and/or pressure of the gas stream permits the apparatus to be flexibly adapted to varying operating conditions also on short call. With the gas temperature and feed flow selected to suit, the gas stream will have a cooling effect on adjacent components.

Temperature and pressure induced distortions of the components are advantageously balanced automatically by causing the fluid to consistently urge the sealing strip into the clearance at a nearly constant pressure. In a preferred aspect of the present invention the second component is provided with cooling ducts, as it will be necessary with thermally highly-stressed variable nozzle flaps on exhaust gas nozzles, and the cooling ducts are connected to the feed ducts to permit the passage of fluid. Interconnecting the ducts in this manner ensures the supply of fluid to the sealing apparatus while eliminating the need for additional inlet lines from a fluid source. Simultaneously, effective cooling of the sealing strip can be achieved.

In an advantageous aspect of the present invention the groove takes the shape of a V-slot, making the groove easy to manufacture. For this purpose, the sealing strip is given a triangular section.

In an alternative arrangement the sealing strip is given a rectangular section, which permits the automatic balancing of expansion movements of the components relative to one another without causing the size of fluid clearance between the legs of the groove and the sealing strip to change. This eliminates the risk of adversely affecting the flow by expansion movements. In a further preferred aspect of the present invention the sealing strip is given a rectangular section with a round projection. This reduces the risk of canting when the components are moving.

A sealing strip optimized to reduce the canting risk is provided by an embodiment of the invention which has a circular section shaped sealing strip. Additionally, the actuating forces needed to displace the components can then be reduced, the round sealing strip being able to travel across the sealing face through rolling motion.

To reduce also the actuating forces of sealing strips with an abutting lateral surface, these strips are designed in accordance with certain preferred embodiments with relief grooves. Pressurizing the relief grooves with fluid under operating pressure causes a force component to counter the contact pressure of the sealing strip and so reduces the actuating force required to move the components.

In certain preferred embodiments, the sealing strip is segmented to ensure it conforms to the sealing surface when in contact with it. The sealing integrity of the sealing apparatus is therefore ensured also when the sealing face should warp.

To give the sealing apparatus greater thermal stability and reduce thermal expansions when the components are exposed to high-temperature gases, preferred embodiments include cooling grooves.

In certain preferred embodiments, seal cooling ducts or grooves are tapped at a compressor of a gas turbine engine in connecting lines and the components are a lateral wall and a variable nozzle flap of an exhaust gas nozzle. The use of this arrangement on turbojet engines provides special advantages in that the contact pressure of the sealing strip against the lateral wall of an exhaust gas nozzle is made a function of engine load, the pressure being supplied by air tapped at the turbojet engine's compressor.

Other objects, advantages and novel features of the present invention will become apparent from the following detailed description of the invention when con-

DETAILED DESCRIPTION OF THE DRAWINGS

Figure 1:
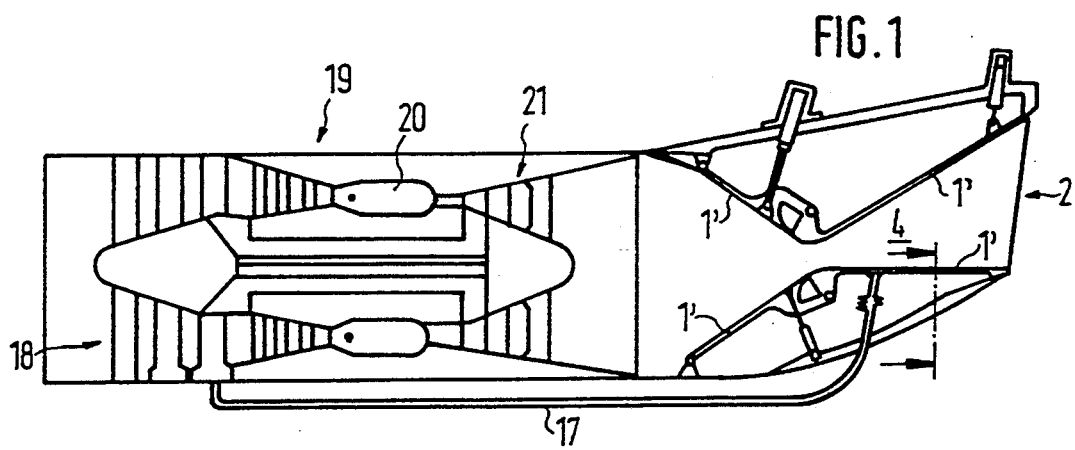
FIG. 1 is a schematic longitudinal sectional view illustrating a turbojet engine with variable exhaust gas nozzle, constructed according to a preferred embodiment of the invention.

With reference now to FIG. 1, a turbojet engine is shown with an exhaust gas nozzle 2 made variable by means of two movable nozzle flaps 1'. Upstream of the exhaust gas nozzle 2, the turbojet engine has a gas turbine 19 with a compressor 18, combustion chamber 20 and turbine 21 of conventional construction. For actuating the exhaust gas nozzle 2, the nozzle flaps 1' move between two mutually parallel plane lateral walls 3' and together form a variable interior nozzle space 4 of rectangular cross section.

To actuate the exhaust gas nozzle 2 the nozzle flaps 1' move along the lateral walls 3' (see FIGS. 2 through 6). Since leaks between the nozzle flap 1' and the lateral wall 3', which extend normal to one another, cause thrust losses, the clearances 5 forming between the respective faces of the nozzle flaps 1' and the sealing faces 9' of the two lateral walls 3' need sealing.

To seal these clearances 5 a sealing strip 7 extends along the respective face 6 of the nozzle flap 1', said face 6 facing a side wall 3'. This sealing strip 7 is seated in contactless arrangement within a groove 8 which opens in the direction of the lateral wall 3'. To position the sealing strip 7 within the groove 8, the sealing strip 7 is energized with air under pressure and urged against the sealing face 9 of the lateral wall 3'. For this purpose, air is tapped from the cooling ducts 16 of the nozzle flap 1' through feed ducts 10 and routed to the groove 8. In operation, air is caused to flow into the space 15 formed between the sealing strip 7 and the groove walls 11, from there into the nozzle chamber 4 and into the space partitioned off by it, cooling the wetted components in the process. The air used to cool the nozzle flaps 1' and pressurize the sealing strips 7 is tapped at the compressor 18 of the gas turbine 19 and ducted to the cooling ducts 16 through a connecting line 17.

In the drawing FIGS. 2-5, different sealing strip configurations are illustrated, with corresponding drawing reference characters, and respective suffices A-D, for depicting generally similarly functioning features. Unless otherwise indicated reference to descriptions of other of the embodiments can be made for a description of the respective features of the various embodiments.

Figure 2:
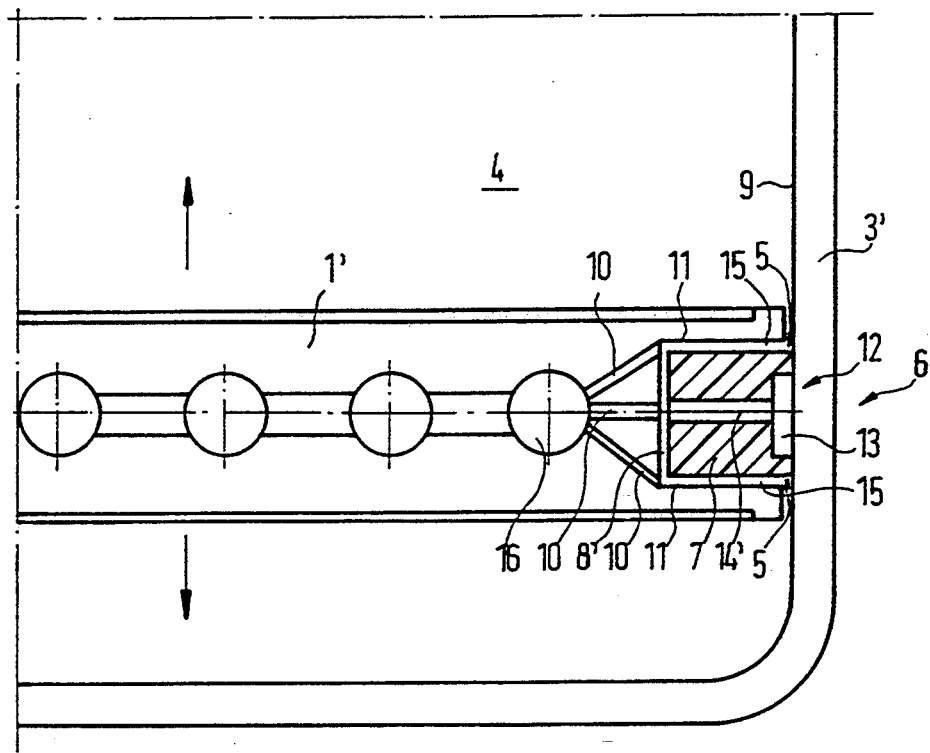
FIG. 2 is a sectional view illustrating a portion of a first nozzle flap embodiment with rectangular sealing strip usable in the arrangement of FIG. 1.

FIG. 2 illustrates the sealing strip 7A of rectangular section, where the lateral surface 12A bearing against the sealing face 9A is provided with a relief groove 13A (cf. FIG. 3) extending in the long direction of the sealing strip 7A. This relief groove 13A communicates with the groove 8A through ducts 14A taking the shape of drilled holes 14A' to permit the flow of air and so relieve the contact pressure. This reduces the actuating force needed to actuate the nozzle flaps 1'.

The groove 8A is given a rectangular shape 8A' to match the section of the sealing strip 7A, the strip 7A being allowed to be displaced inside the groove to accommodate expansions.

Figure 3:
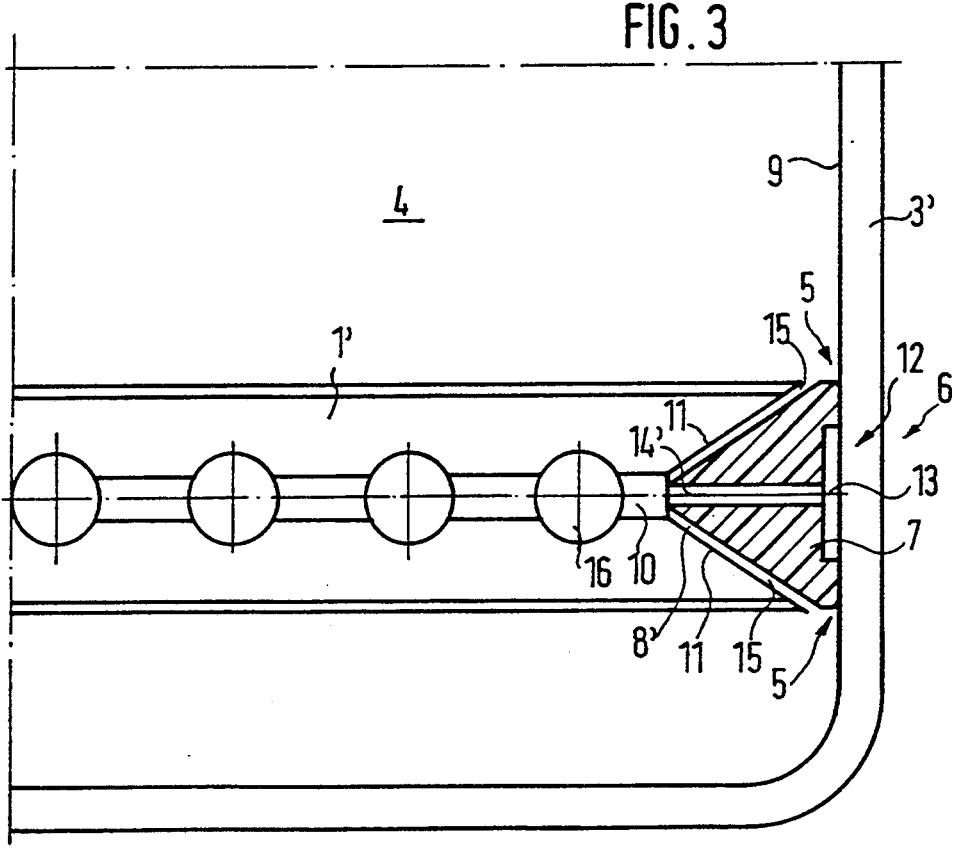
FIG. 3 is a sectional view illustrating a portion of a second nozzle flap embodiment with triangular sealing strip usable in the arrangement of FIG. 1.

FIG. 3 shows a sealing strip 7B of triangular, isosceles section and a relief groove 13B as described above. The sealing strip 7B floats on the air stream in the V-shaped groove 8B' which opens towards the lateral wall 3B' where the walls 11B of the groove 8B' extend in parallel with the two isosceles lateral faces of the sealing strip 7B.

Figure 4:
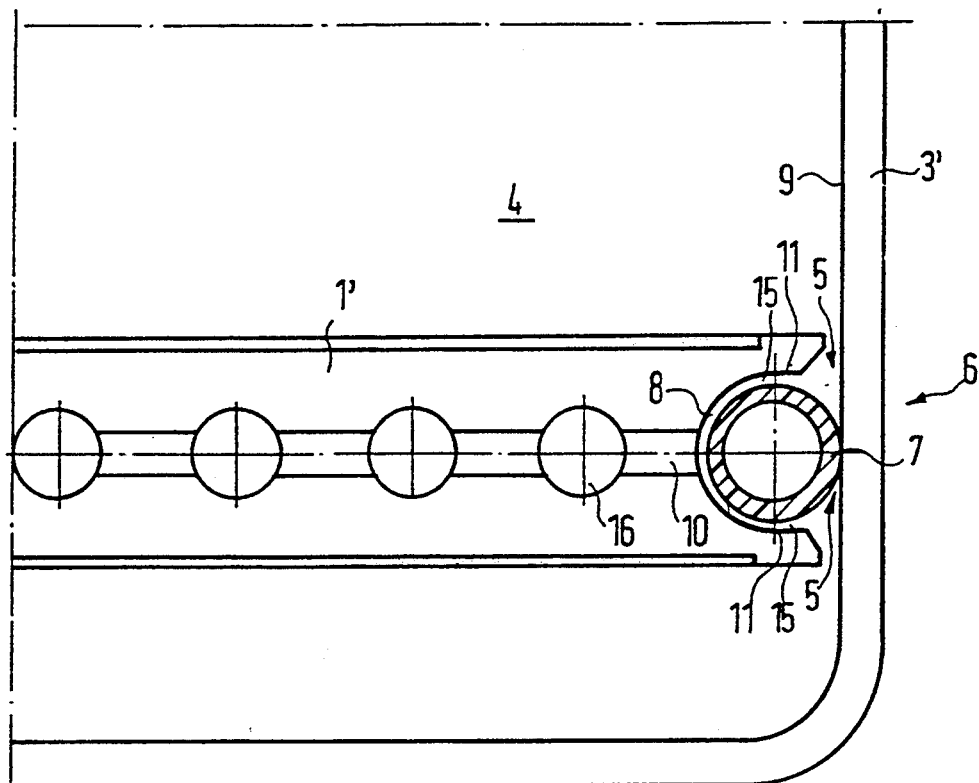
FIG. 4 is a sectional view illustrating a portion of a third nozzle flap embodiment with circular sealing strip usable in the arrangement of FIG. 1.

FIG. 4 shows a tubular sealing strip 7C of circular section arranged in a groove 8C of semicircular section, said groove opening towards the lateral wall 3C'. To permit compensation movements of the sealing strip 7C in the direction of the lateral wall 3C', the cutout is extended by two mutually parallel wall faces 11C, 11C'.

Figure 5:
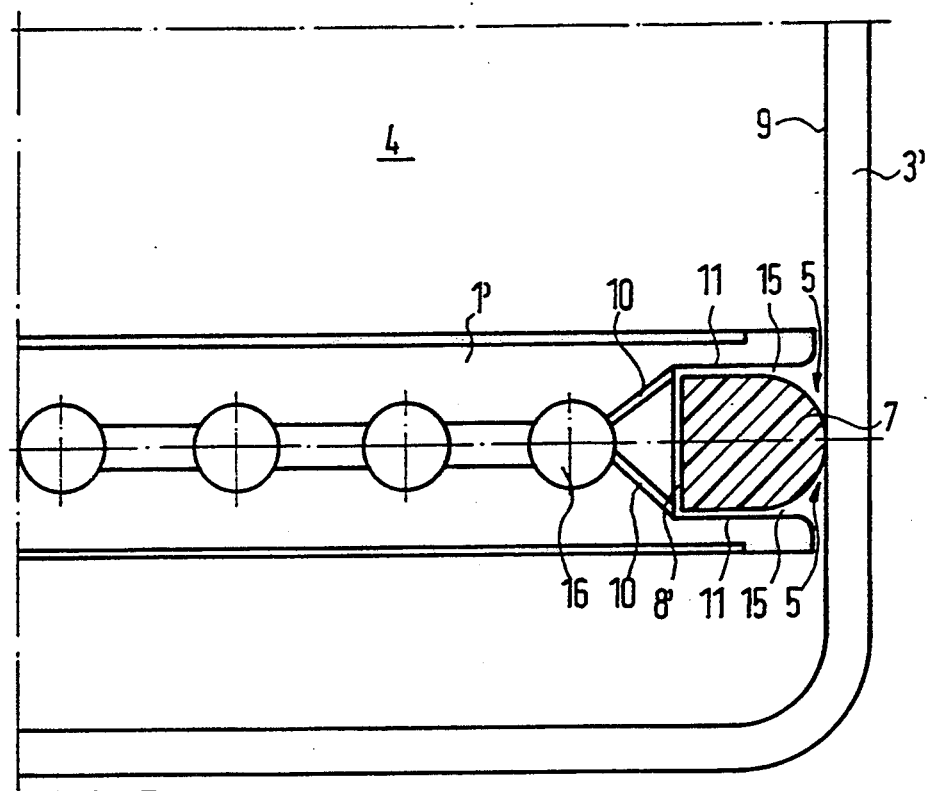
FIG. 5 is a sectional view illustrating a portion of a fourth nozzle flap embodiment with rectangular sealing strip and round projection usable in the arrangement of FIG. 1.

A combination of sealing strip 7D of rectangular with circular section will become apparent from FIG. 5. In this arrangement the sealing strip 7D is provided at the lateral wall with a round projection bearing against the sealing face 9D for sealing effect.

Figure 6:
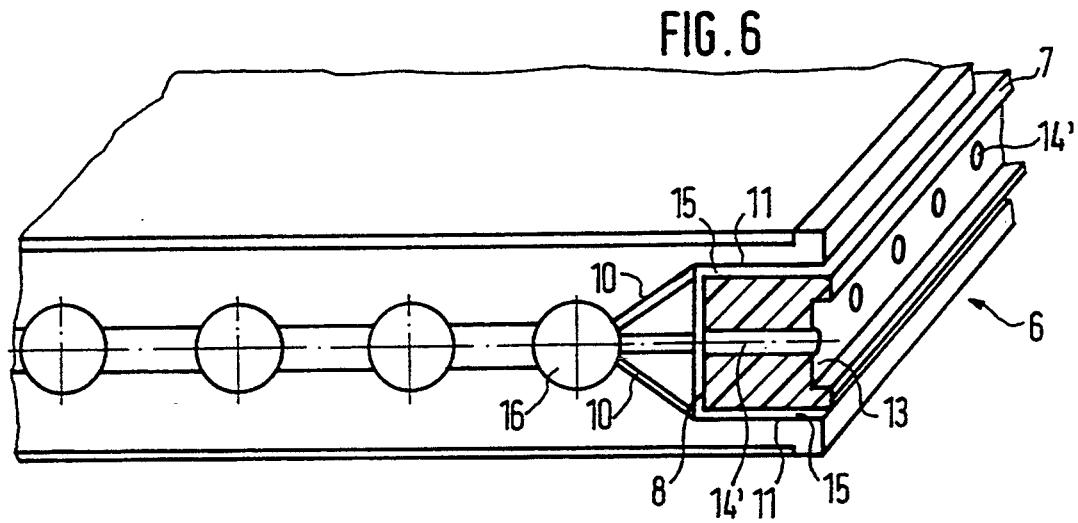
FIG. 6 is a partial perspective view illustrating a portion of a fifth nozzle flap embodiment with a rectangular sealing strip usable in the arrangement of FIG. 1.

FIG. 6 illustrates a rectangular sealing strip 7E with drilled holes 14E' to permit the flow of air and so relieve the contact pressure.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Apparatus comprising first and second components in relative movement with respect to one another, and having a clearance therebetween, and a sealing strip arranged between the two components to be movable in a direction transverse to the direction of relative movement to bear against a sealing face of the first component to seal the clearance, wherein the sealing strip is allowed to float in a groove in the second component on a fluid flowing all around between the groove and the sealing strip and is urged by the fluid against the first component without any mechanical devices acting on the sealing strip in a direction toward the first component, wherein the fluid is channeled into the groove through feed ducts in the second component, and wherein the operating pressure of the fluid exceeds the ambient pressure surrounding the components.

2. Apparatus of claim 1, wherein the groove is a V-shaped slot opening towards the first component and the sealing strip is of triangular section, and wherein a lateral face of the sealing strip which points away from the groove bears against the sealing face.

3. Apparatus of claim 2, wherein the sealing strip is provided on the sealing face side with a relief groove extending in the long direction of the sealing strip, said relief groove communicating with the groove through ducts to enable the flow of fluid.

4. Apparatus of claim 3, wherein the sealing strip is segmented.

5. Apparatus of claim 1, wherein the sealing strip is of rectangular section and is arranged tongue-and-groove fashion between two mutually parallel walls, and wherein a lateral face of the sealing strip bears against the sealing face.

6. Apparatus of claim 5, wherein the sealing strip is provided on the sealing face side with a relief groove extending in the long direction of the sealing strip, said relief groove communicating with the groove through ducts to enable the flow of fluid.

7. Apparatus of claim 1, wherein the sealing strip is of rectangular section and has a round projection, wherein the projection points away from the groove and abuts the sealing face, and wherein the sealing strip is arranged tongue-and-groove fashion between two mutually parallel walls.

8. Apparatus of claim 1, wherein the sealing strip is of circular section.

9. Apparatus of claim 1, wherein the sealing strip is segmented.

10. Apparatus of claim 1, wherein the sealing strip is made flexible.

11. Apparatus of claim 1, wherein the second component is provided with cooling ducts which communicate with the feed ducts to permit the flow of fluid, and wherein said fluid is a cooling fluid.

12. Apparatus of claim 11, wherein the cooling fluid is tapped at the compressor of a gas turbine engine through connecting lines to be routed to the cooling ducts.

13. Apparatus of claim 12, wherein the first component represents the lateral wall of an exhaust gas nozzle.

14. Apparatus of claim 13, wherein the second component represents a variable nozzle flap of an exhaust gas nozzle.

15. Apparatus of claim 1, wherein the first component represents the lateral wall of an exhaust gas nozzle.

16. Apparatus of claim 1, wherein the second component represents a variable nozzle flap of an exhaust gas nozzle.

17. Apparatus of claim 1, wherein the sealing strip is provided on the sealing face side with a relief groove extending in the long direction of the sealing strip, said relief groove communicating with the groove through ducts to enable the flow of fluid.

18. Apparatus of claim 17, wherein the sealing strip is made flexible.

19. Apparatus of claim 18, wherein the second component is provided with cooling ducts which communicate with the feed ducts to permit the flow of fluid, and wherein said fluid is a cooling fluid.

20. Apparatus of claim 1, wherein the first component represents the lateral wall of an exhaust gas nozzle of a turbojet engine and the second component represents a variable nozzle flap of the exhaust gas nozzle.

* * * * *